United States Patent

[11] 3,566,200

[72] Inventor Robert L. Seidler
6 Plymouth Road, Summit, N.J. 07901
[21] Appl. No. 826,430
[22] Filed May 21, 1969
[45] Patented Feb. 23, 1971

[54] PROTECTIVE BIASING CIRCUIT FOR TRANSISTORS
9 Claims, 2 Drawing Figs.

Figure 1:
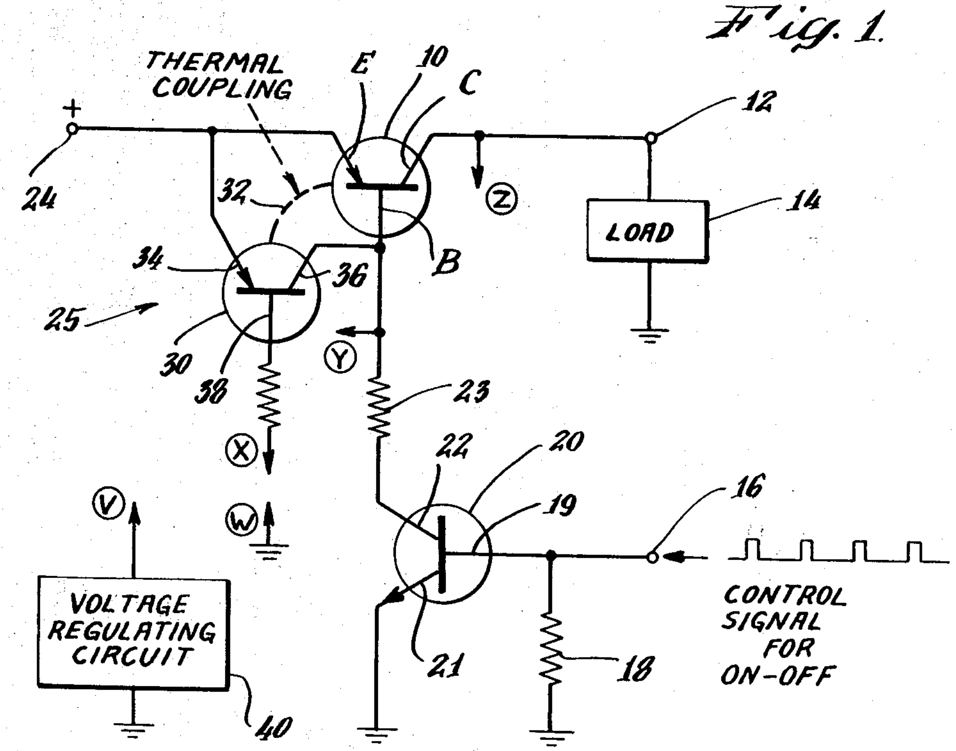

[52] U.S. Cl. .......... 317/33, 307/202, 307/315, 317/40, 317/43
[51] Int. Cl. .......... H02h 3/08, H02h 7/20
[50] Field of Search .......... 317/33, 40, 43, 235/29; 307/202, 315, 310, (Inquired)

[56] References Cited

UNITED STATES PATENTS 3,246,210 4/1966 Lorenz .......... 307/315X
3,258,606 6/1966 Meadows .......... (317/235/29)
3,421,102 1/1969 Andrews .......... 307/310X

*Primary Examiner*—James D. Trammell
*Attorney*—Robertson, Bryan, Parmelee & Johnson ABSTRACT: A protective biasing circuit is described for transistors to control their leakage current and to provide reverse-polarity protection for them, this protective biasing circuit being particularly advantageous in use with power switching transistors of either the Germanium or Silicon types. The biasing circuit includes a transistor of the same polarity type and leakage characteristic as the transistor it controls and thermally coupled to the transistor it controls so that its temperature varies in the same manner as the one it controls. The emitters of the two transistors are connected together and the collector of the protective biasing transistor is connected to the base of the controlled transistor, and the base of the protective biasing transistor is connected through a resistor of relatively large resistance value in a predetermined range to a voltage point which is lower in potential than the source of the power for the controlled transistor.

INVENTOR.
Robert L. Seidler
BY
Robertson, Bryan, Parmelee & Johnson
ATTORNEYS.

PROTECTIVE BIASING CIRCUIT FOR TRANSISTORS

BACKGROUND OF THE INVENTION

Transistors, and particularly power switching transistors of the Germanium or Silicon type exhibit the characteristic that when they become heated, as from an increase in ambient temperature or from localized heating in the circuit, a leakage current will flow through the base-collector junction. This current leakage tends to forward bias the emitter-base junction, causing current to flow from the emitter to the base and thence in the collector-base path, which thereby increases the leakage, tending further to forward bias the emitter-base junction, and so forth. The resulting emitter current flow build up tends to partially "turn on" the emitter to collector path so that a substantial current flow occurs through the emitter-collector path. At the same time the partial "on" condition causes a substantial voltage drop to occur within the transistor itself; consequently, a maximum power dissipation condition occurs within the transistor, which soon destroys it.

This condition, sometimes called "thermal runaway" is a serious problem, and so far as I am aware it has not been satisfactorily solved by the prior art.

The present invention relates to a protective biasing circuit for transistors to control their leakage current so as to prevent thermal runaway and also to provide reverse-polarity protection for them, the protective biasing circuit embodying the present invention being particularly advantageous for use with power switching transistors of either the germanium or silicon types.

The protective biasing circuit as shown includes a transistor of the same polarity type and leakage characteristics as the transistor which it controls and being thermally coupled to the transistor which it controls so that the temperature of the two transistors vary in the same manner. The emitters of the two transistors are connected together, and the collector of the protective biasing transistor is connected to the base of the controlled transistor so that the emitter-collector current flow path of the protective biasing transistor is in parallel relationship with the emitter-base junction of the controlled transistor. Furthermore, the base of the protective biasing transistor is connected through a resistor of relatively large resistance value as explained in detail further below to a connection point having a potential which is lower than the potential of the source of power for the controlled transistor.

Among the advantages of the protective biasing circuit of the present invention are those resulting from the fact that when the temperature rises, the leakage current through both the biasing and the controlled transistors increases without substantially increasing the forward bias between the emitter and base electrodes of the controlled transistor.

Another advantage of the protective biasing circuit of the invention are those resulting from the fact that this biasing circuit has little effect on the gain of the controlled transistor.

A further advantage of the protective biasing circuit is that it not only prevents "thermal runaway" and provides reverse polarity protection but also provides a path for collector-base leakage currents without adding voltage drops to the circuit.

Figure 2:
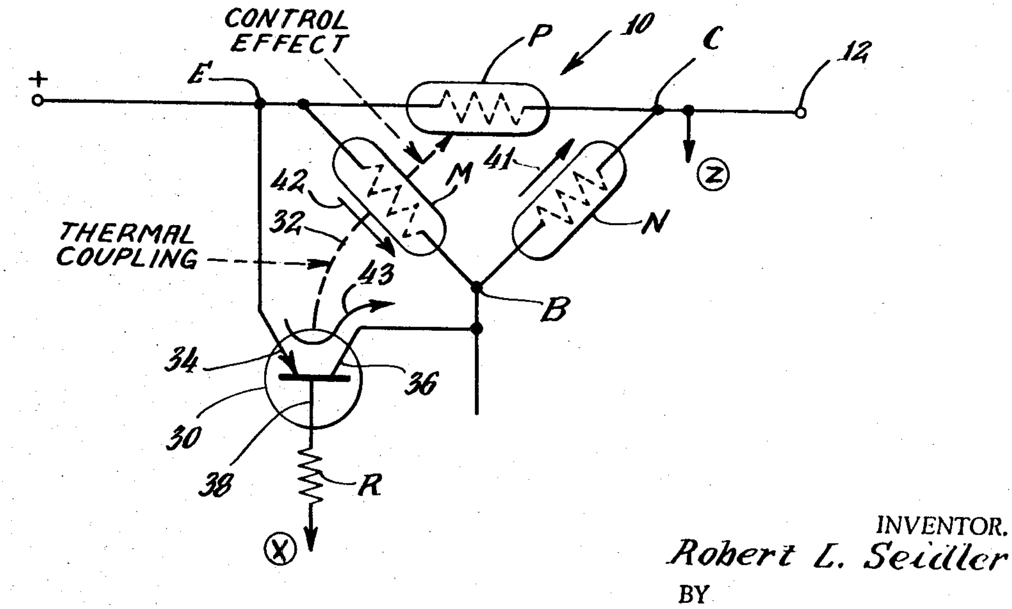

Additional features, aspects and advantages of the present invention will become more fully understood from a consideration of the following detailed description of a presently preferred embodiment of the invention. In the drawings:

FIG. 1 is a schematic circuit diagram of a circuit including a controlled transistor and the protective biasing circuit associated therewith; and FIG. 2 is a schematic circuit diagram for purposes of explanation.

Referring to the drawings in detail, FIG. 1 shows a controlled transistor 10 for controlling the electrical current fed to an output terminal 12 to which an electrical load 14 may be connected. In this illustrative embodiment the electrical load 14 is a high power signal lamp, and the controlled transistor 10 is a power-switching transistor for flashing the signal lamp 14 on and off in accordance with an electrical control signal which is fed into an input terminal 16.

The control signal for turning the signal lamp 14 on and off is applied across an input resistor 18 connected to the base electrode 19 of an NPN transistor 20 which serves to control the operation of the controlled transistor 10 by switching the latter transistor 10 on and off in accordance with the control signal applied to the input terminal 16. The emitter electrode 21 is connected to the common return or "ground" side of the circuit and the control electrode 22 is connected through a current limiting resistor 23 to the base electrode B of the controlled transistor 10. The controlled transistor 10 is a PNP transistor having its emitter electrode E connected to the positive terminal 24 of a source of direct current and having its collector C connected to the output terminal 12. It is noted that the source of current has its negative terminal connected to the common return.

To protect the controlled transistor 10 against "thermal runaway" and to provide reverse polarity protection, a protective biasing circuit 25 is provided. The circuit 25 includes a biasing transistor 30 of the same polarity type and of the same electrical leakage characteristics as the controlled transistor 10.

The biasing transistor 30 is thermally coupled to the controlled transistor 10 so that the temperature of the biasing transistor 30 will always be substantially the same as the temperature of the controlled transistor. This thermal coupling is provided by mounting the two transistors close together and preferably also by mounting them both on a thermally conductive mounting member 32 having good heat conduction characteristics for equalizing their temperatures under all operating and ambient conditions to be encountered, such as a metallic mounting 32 of good heat conduction characteristics, for example of copper, brass, aluminum, or the like. This thermally conducting mounting 32 may serve as a common heat sink for both transistors.

The emitter electrode 34 of the protective biasing transistor 30 is connected to the emitter electrode E of the controlled transistor 10, and its collector electrode 36 is connected to the base electrode B. Its base electrode 38 is connected to a resistor R of relatively large resistance value with the opposite side X of this resistor R being attached to a connection point having a predetermined potential, which is always less than that of the power supply terminal 20. There are several possible connection points which meet this desired criterion with respect to potential level; these points are indicated as V, W, Y and Z. The point W is the common return circuit; point Y is connected to the base electrode B; point Z is connected to the collector C; and point V is connected to a voltage-regulating circuit 40, which may include a Zener diode and be energized from the source 20.

An advantage of this protective biasing circuit is that it can serve as a source of a very small current flow for use in other circuits in an electrical system associated with the protected transistor 10. An example of such a circuit utilizing a small-current flow is a voltage-regulating circuit 40 containing a Zener diode. Therefore, when such small-current flow usage circuit 40 is present, the point V is the preferred connection point.

When such other small-current flow usage circuit 40 is not present, then the ground connection point W is usually preferred. Therefore, in many commercial applications the resistor terminal X is connected to the point W at ground potential. To secure a potential above ground potential but less than supply potential existing at terminal 20, the connection points Y or Z may be used. An advantage of using the connection point Z is that when the protected transistor 10 turns on, the voltage of point Z rises, which reduces the emitter 34 to base 36 voltage differential. This reduction of the emitter-base drive of the transistor 30 reduces the slight current flow through resistor R, which slightly increases the gain of transistor 10 and slightly reduces the overall current drain from the power source.

The resistance value of the resistor R is in a predetermined range which is relatively large as compared with the other resistors in the circuit. The lower end of this predetermined range is set by the requirement to maintain the effective gain of the controlled transistor and by the desire to provide reverse polarity protection. In practice I have found that this lower limit of the predetermined range is 8,000 ohms for most applications, while a somewhat lower value might be used in certain applications this would not result in the use of the invention to its full advantage.

The upper end of this predetermined range is set by the requirement to maintain protection for the controlled transistor 10 even when the ambient temperature drops to the lowest possible operating value. In practice I have found that this upper limit of the predetermined range is ten times the lower limit, namely, 80,000 ohms. In most circuits optimum performance is secured by staying within the limits from 10,000 to 30,000 ohms.

To understand the operation it is believed that reference to the diagram of FIG. 2 in conjunction with FIG. 1 will be helpful. The controlled transistor 10 is schematically illustrated as having three possible current flow paths with respect to the emitter, base and collector electrodes E, B and C, respectively. These current flow paths are indicated as M, N and P. In operation there is leakage current flow, as indicated by the arrow 41, through the base-collector path N, and the current leakage through path N increases with increasing temperature of the transistor 10. The leakage current 41 tends to forward bias the emitter base path M, allowing current 42 to flow through path M which allows an increase in current flow 41, which further increases the current flow 42, and so forth. The emitter base current flow 42 resulting from this leakage action acts through the transistor control effect as indicated to partially turn on the emitter-collector flow path P, leading to substantial current flow in path P and hence maximum power dissipation therein, often causing the transistor to destroy itself as a result of this "thermal runaway."

The protective biasing transistor 30 has its emitter-collector flow path in parallel relationship with the emitter-base flow path M. Hence, any leakage current 41 is bypassed through the protective transistor 30 as indicated by the arrow 43, thus minimizing the current flow 42 and so preventing thermal runaway of the controlled transistor 10. Moreover, when the temperature increases, causing increase in leakage current 41, the thermal coupling 32 assures that a corresponding temperature increase occurs in the transistor 30, reducing the impedance of the emitter to collector path of transistor 30, and hence allowing an increased bypass current 43 to flow, without significantly affecting the current gain of the transistor 10.

In the event that a reversed polarity is applied to the controlled transistor 10, i.e. if a positive voltage is applied to the collector C or if a negative voltage is applied to the emitter E, the protective biasing transistor 30 acts as a rectifier and prevents the controlled transistor 10 from conducting in the reverse direction, as long as the base-emitter breakdown voltage of the transistor 10 is not exceeded.

It is to be understood that this invention can be utilized to advantage with any transistors and particularly with power transistors of either the germanian or silicon type. The controlled transistor 10 is of the PNP type, but it is to be understood that this invention can be employed to advantage also for protecting transistors of the NPN type, in which case the biasing transistor 30 is also of the NPN type. The opposite side X of the resistor R is connected to a connection point V, W, Y or Z having a potential "less" than the potential of the power supply connection 24.

T In the case of a controlled PNP transistor 10, the power supply connection 24 is positive, and the connection point V, W, Y or Z is at "less" positive potential level, which includes ground potential.

In the case of a controlled NPN transistor 10, the power supply connection 24 is negative, and then the connection point V, W, Y or Z is at a "less" negative potential level, which includes ground potential.

The phase "at a potential 'less ' than the potential supply" as used in the claims is intended to include both the positive and negative cases.

The terms and expressions which have been employed are used in a descriptive and not a limiting sense, and I have no intention of excluding equivalents of the invention described and claimed.

I claim:

1. A protective biasing circuit for a controlled transistor for protecting the transistor against "thermal runaway" and also protecting it against the application of a reversed polarity current source, said protective biasing circuit comprising: a controlled transistor having an emitter electrode and a collector electrode of one polarity type and having a base electrode of the opposite polarity type; a power supply connection to said emitter electrode for supplying current thereto and an output connection from said collector electrode for feeding current controlled by said transistor to a load; a protective biasing transistor of the same polarity type and same leakage characteristics as said controlled transistor; thermal coupling means providing thermal coupling between said transistors for assuring that said biasing transistor remains at substantially the same temperature as said controlled transistor; said biasing transistor having its emitter electrode connected to the emitter electrode of said controlled transistor and having its collector electrode connected to the base electrode of said controlled transistor for placing the emitter-collector current flow path of said biasing transistor in parallel relationship with the emitter-base current flow path of said controlled transistor; said biasing transistor having its base connected to a resistor of relatively large resistance value; and the opposite side of said resistor being connected to a circuit connection point having a potential "less" than the supply potential applied to the emitter electrode of said controlled transistor.

2. A protective biasing circuit for a controlled transistor as claimed in claim 1 in which said resistor has a resistance value in the range from 8,000 ohms to 80,000 ohms.

3. A protective biasing circuit for a controlled transistor as claimed in claim 2 in which said resistor has a resistance value within the preferred range from 10,000 ohms to 30,000 ohms.

4. A protective biasing circuit for a controlled transistor as claimed in claim 1 in which said connection point for the opposite side of said resistor is a voltage regulating circuit supplying a regulated voltage of potential "less" than the supply potential applied to said emitter electrode of said controlled transistor.

5. A protective biasing circuit for a controlled transistor as claimed in claim 1 in which the power supply has one side connected to the emitter of said controlled transistor and has the opposite side connected to a "ground" return circuit and in which said circuit connection point for the opposite side of said resistor having a potential "less" than the supply potential applied to the emitter of said controlled transistor is the "-ground" return circuit.

6. A protective biasing circuit for a controlled transistor as claimed in claim 1 in which said circuit connection point for the opposite side of said resistor having a potential "less" than the supply potential applied to the emitter of said controlled transistor is the base electrode of said controlled transistor.

7. A protective biasing circuit for a controlled transistor as claimed in claim 1, in which said circuit connection point for the opposite side of said resistor having a potential "less" than the supply potential applied to the emitter of said controlled transistor is the collector electrode of said controlled transistor.

8. A protective biasing circuit for a controlled transistor as claimed in claim 1, in which said controlled transistor and said protective biasing transistor are both PNP type transistors; said thermal coupling means being a common heat sink of metal having good heat conduction characteristics; and said transistors being closely mounted on said common heat sink.

9. A protective biasing circuit for a controlled transistor as claimed in claim 1, in which said controlled transistor and said protective biasing transistor are both NPN type transistors; said thermal coupling means being a common heat sink of metal having good heat conduction characteristics; and said transistors being closely mounted on said common heat sink.